United States Patent
Brown

(10) Patent No.: US 8,958,141 B1
(45) Date of Patent: Feb. 17, 2015

(54) ULTRA-BROADBAND, PLASMONIC, HIGH-REFRACTIVE INDEX MATERIALS, UBHRI-GRIN-LENSES-AND OTHER OPTICAL COMPONENTS

(76) Inventor: Robert G. Brown, Tustin, CA (US)

( * ) Notice: Subject to any disclaimer, the term of this patent is extended or adjusted under 35 U.S.C. 154(b) by 152 days.

(21) Appl. No.: 13/609,012

(22) Filed: Sep. 10, 2012

(51) Int. Cl.
*G02B 1/00* (2006.01)
*G02B 3/00* (2006.01)

(52) U.S. Cl.
CPC . *G02B 3/00* (2013.01); *Y10S 359/90* (2013.01)
USPC ............ 359/326; 359/620; 359/652; 359/900

(58) Field of Classification Search
USPC ......... 359/326–332, 619, 620, 626, 642, 652, 359/900; 351/41, 159.01, 159.02, 159.39, 351/159.73, 159.74, 159.75
See application file for complete search history.

(56) References Cited

U.S. PATENT DOCUMENTS

| | | | |
|---|---|---|---|
| 7,403,683 B2 * | 7/2008 | Chern et al. ................... 385/39 |
| 8,681,428 B1 * | 3/2014 | Brown ........................... 359/642 |
| 2009/0040132 A1 * | 2/2009 | Sridhar et al. ............ 343/911 R |
| 2009/0073434 A1 * | 3/2009 | Kim et al. ..................... 356/317 |
| 2011/0098033 A1 * | 4/2011 | Britz et al. .................. 455/422.1 |

OTHER PUBLICATIONS

U.S. Appl. No. 13/438,433, filed Apr. 3, 2012, Rockwell Collins.
Pendry, et al., 'Controlling Electromagnetic Fields': Science, Jun. 2006, pp. 1780-1782, vol. 312, 3 pages.

* cited by examiner

*Primary Examiner* — Daniel Petkovsek
(74) *Attorney, Agent, or Firm* — Angel N. Gerdzhikov; Donna P. Suchy; Daniel M. Barbieri

(57) ABSTRACT

A broadband optical material is described. The broadband optical material includes a stacked structure having a plurality of layers of metamaterial. Each layer of metamaterial has a matrix material and a plurality of nano-particles. The plurality of nano-particles are geometrically arranged in an array within the matrix material such that the layer of metamaterial has a refractive index plasmon resonance based on a cooperative plasmon effect at a predetermined electro-magnetic radiation (EMR) wavelength, wherein the predetermined EMR wavelength for the refractive index plasmon resonance is different for each of the layers of metamaterial.

22 Claims, 5 Drawing Sheets

ULTRA-BROADBAND, PLASMONIC, HIGH-REFRACTIVE INDEX MATERIALS, UBHRI-GRIN-LENSES-AND OTHER OPTICAL COMPONENTS

FIELD OF THE INVENTION

The present disclosure relates to a broadband optical material having a stacked structure of a plurality layers of metamaterial, and optical elements of the broadband optical material.

BACKGROUND OF THE INVENTION

Conventional lenses are typically formed of a number of varying thickness pieces of glass or plastic to make lenses, where the glass or plastic has a particular index of refraction.

The recent development of Transformation Optics (TO) provides a new way of looking at the independent control of the electrical and magnetic components of electromagnetic fields [see Pendry, J. B., Schurig, D. & Smith, D. R., (2006) 'Controlling electromagnetic fields', Science, 312, pp. 1780-1782]. TO is enabled in practice through the use of metamaterials. As disclosed in Pendry et al. " . . . metamaterials owe their properties to their sub-wavelength material-structure rather than to their chemical composition, and can be designed to have properties impossible to find in nature."

At the sub-wavelength level, light breaks up into its component electrical and magnetic fields, and the concept of a ray of light is meaningless. In this case, TO replaces Snell's Law of Refraction. TO is the valid mathematics at the sub-wavelength scale.

U.S. patent application Ser. No. 13/438,433, entitled "HIGH REFRACTIVE INDEX, POLARIZATION INSENSITIVE NANO-ROD BASED PLASMONIC METAMATERIALS FOR LENSES", filed on Apr. 3, 2012, which is incorporated by reference in its entirety herein, discloses the use of plasmonic metamaterials as a high index of refraction optical material, where the optical material may be used for lenses, such as Graded Index (GRIN) lenses.

SUMMARY OF THE INVENTION

According to one exemplary embodiment, there is provided a broadband optical material. The broadband optical material comprises: a stacked structure comprising a plurality of layers of metamaterial, each layer of metamaterial comprising: a matrix material; and a plurality of nano-particles geometrically arranged in an array within the matrix material such that the layer of metamaterial has a refractive index plasmon resonance based on a cooperative plasmon effect at a predetermined electro-magnetic radiation (EMR) wavelength, wherein the predetermined EMR wavelength for the refractive index plasmon resonance is different for each of the layers of metamaterial.

According to an aspect of the embodiment, for each of the plurality of layers, the nano-particles are arranged in the array such that nano-particles resonate in the plane of a respective layer, but do not resonate tangentially to the plane.

According to an aspect of the embodiment, at least one of the layers of metamaterial has at least one of a spatially varying nano-particle length, nano-particle width, or nano-particle lattice constant.

According to an aspect of the embodiment, at least one of the layers of metamaterial has a spatially varying nano-particle length.

According to an aspect of the embodiment, at least one of the layers of metamaterial has a spatially varying nano-particle width.

According to an aspect of the embodiment, at least one of the layers of metamaterial has a spatially varying nano-particle lattice constant.

According to an aspect of the embodiment, a gradient index (GRIN) lens comprises the broadband material, wherein each layer of metamaterial has a spatially varying refractive index.

According to an aspect of the embodiment, each layer of metamaterial has at least one of a spatially varying nano-particle length, nano-particle width, or nano-particle lattice constant.

According to an aspect of the embodiment, for each of the plurality of layers, the nano-particles are arranged in the array such that nano-particles resonate in the plane of a respective layer, but do not resonate tangentially to the plane.

According to an aspect of the embodiment, an optical system comprises the broadband optical material.

According to an aspect of the embodiment, the optical system is one of a micro-lens and nano-lens arrays, a lens-array for a focal-plane array detector, an ultra-wide bandwidth hyper-spectral imagery system, a telecommunication spatial-multiplexing and signal cross/inter-connections system, a biological and medical imaging at the cellular and sub-cellular spatial-scale system, or a miniaturized 3D-integral-imaging and computational-imaging system.

According to an aspect of the embodiment, the plurality of nano-particles are formed by at least one of electron-beam lithography, focused ion-beam, nano-imprinting, colloidal-suspension patterning, biological assembly methods, DNA-scaffolding techniques, membrane projection, or colloid hole lithography.

According to an aspect of the embodiment, at least one of the layers of metamaterial has nano-particles of a different material than that of at least another of the layers of metamaterial.

According to an aspect of the embodiment, the nano-particles in at least one of the layers of metamaterial have a long axis.

According to an aspect of the embodiment, the long axis is oriented in a direction parallel to a plane of the at least one of the layers.

According to an aspect of the embodiment, the long axis is oriented in a direction perpendicular to a plane of the at least one of the layers.

According to an aspect of the embodiment, a width of the nano-particles in the at least one of the layers of metamaterial is spatially varying in a plane of the at least one of the layers of metamaterial.

According to an aspect of the embodiment, the broadband optical material provides a non-linear optics effect.

According to an aspect of the embodiment, the plurality of layers of metamaterial include layers where the predetermined EMR wavelength is respectively in a least two EMR regions selected from ultraviolet, visible, near infrared, short wave infrared, mid wave infrared, and long wave infrared.

According to an aspect of the embodiment, the plurality of layers of metamaterial include layers where the predetermined EMR wavelength is respectively in a least the ultraviolet, visible, or near infrared.

According to one embodiment of the invention there is provided a method of operating a broadband optical element, where the broadband optical element comprises a stacked structure comprising a plurality of layers of metamaterial, each layer of metamaterial comprising: a matrix material; and a plurality of nano-particles geometrically arranged in an array within the matrix material such that the layer of metamaterial has a refractive index plasmon resonance based on a cooperative plasmon effect at a predetermined electromagnetic radiation (EMR) wavelength, wherein the predetermined EMR wavelength for the refractive index plasmon resonance is different for each of the layers of metamaterial. The method comprises adjusting the broadband optical material to receive EMR.

According to one exemplary embodiment there is provided a method of forming a broadband optical material, where the broadband optical material comprises a stacked structure comprising a plurality of layers of metamaterial. The method comprises forming, for each of the layers of metamaterial, a matrix material; and embedding, for each of the layers of metamaterial, a plurality of nano-particles geometrically arranged in an array within the matrix material such that the layer of metamaterial has a refractive index plasmon resonance based on a cooperative plasmon effect at a predetermined electro-magnetic radiation (EMR) wavelength, wherein the predetermined EMR wavelength for the refractive index plasmon resonance is different for each of the layers of metamaterial.

DETAILED DESCRIPTION OF THE PREFERRED EMBODIMENTS

The inventor has found that a broadband high index of refraction optical material may be formed by stacking individual layers of optical materials, where each of the individual layers is formed of a metamaterial with nano-particles embedded in a matrix material. Each individual layer has a refractive index plasmon resonance based on a cooperative plasmon effect at a predetermined electro-magnetic radiation (EMR). The different individual layers have their respective refractive index plasmon resonances at different predetermined EMR wavelengths. Thus, the stacked structure where the different layers have refractive index plasmon resonances at different wavelengths allows for a broadband high index of refraction optical material across a large range of the EMR spectrum.

Individual layers of High Refractive Index Plasmonic Metamaterials

High Refractive Index Plasmonic Metamaterials for a single layer are disclosed, for example, in U.S. patent application Ser. No. 13/438,433, entitled "HIGH REFRACTIVE INDEX, POLARIZATION INSENSITIVE NANO-ROD BASED PLASMONIC METAMATERIALS FOR LENSES," filed on Apr. 3, 2012, which is incorporated by reference in its entirety herein.

Figure 1:
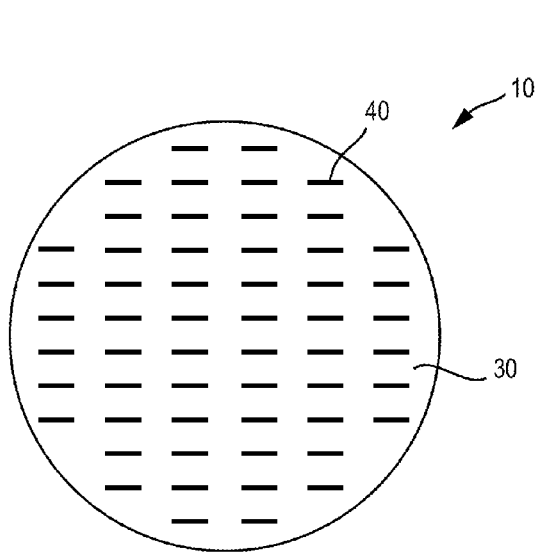
FIG. 1 is a front view of an individual layer of an optical material according to an exemplary embodiment.
Figure 2:
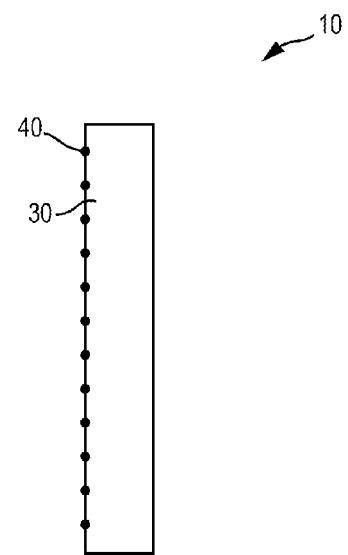
FIG. 2 is a side view of the individual layer of FIG. 1.

FIGS. 1 and 2 illustrate a single individual layer optical material 10 comprising a metamaterial according to an exemplary embodiment illustrating one individual layer of a stacked structure of layers. The individual layer 10 includes a matrix material 30, and a plurality of nano-particles 40 arranged within the matrix material 30. The plurality of nano-particles 40 are geometrically arranged in an array such that single individual layer optical material 10 has a refractive index plasmon resonance based on a cooperative plasmon effect at a predetermined EMR wavelength.

The plurality of nano-particles 40 may be geometrically arranged in at least one of a regular or an irregular array, for example. The array may be at least one of a square array, a rectangular array, a hexagonal array or an octagonal array, for example.

The nano-particles 40 may comprise metals, or transparent conducting oxides or nitrides, for example. The nano-particles 40 may comprise gold, silver, copper, or aluminum. The nano-particles 40 may be at least one of indium tin oxide (ITO), Al:ZnO, Ga:ZnO; TiN or ZrN. The nano-particles 40 may comprise single-walled carbon nanotubes, or highly doped short length semiconductor nanowires. The shapes of the nano-particles 40 may be, for example, cylinders, rods, rectangular cross-section bars, ellipsoid, stars, spheres, spheroids, cones, cups, shells, rings or cubes.

Different materials work best for nano-plasmonic effects in different spectral regions. Gold may be used for near IR (NIR) to THz region of the EMR spectrum, silver for visible to NIR, and aluminum as well as transparent oxides may be used in the ultraviolet region.

Figure 3:
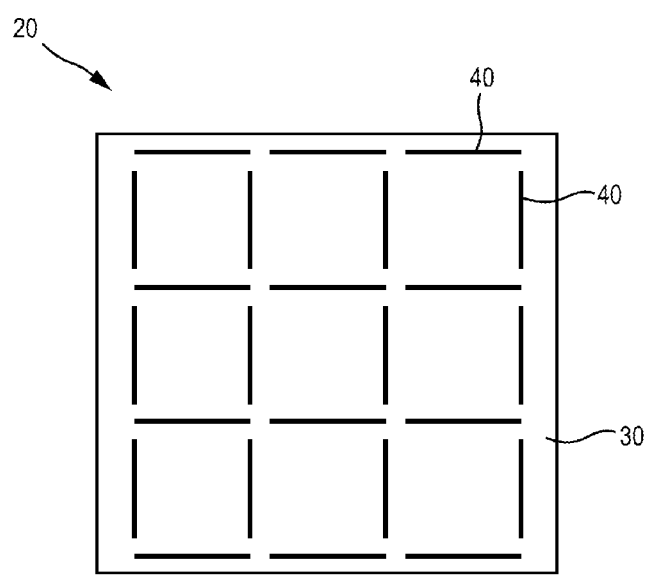
FIG. 3 is a plan view of a square lattice of nano-rods of an individual layer of an optical material according to an exemplary embodiment.

FIG. 3 provides one example of a square array of a metamaterial 20 with nano-particles 40 in a matrix material 30, the nano-particles 40 being nano-rods arranged in a square array which is insensitive to EMR polarization of the EMR being transmitted or reflected.

Stacked Structure of High Refractive Index Plasmonic Metamaterials

Figure 4:
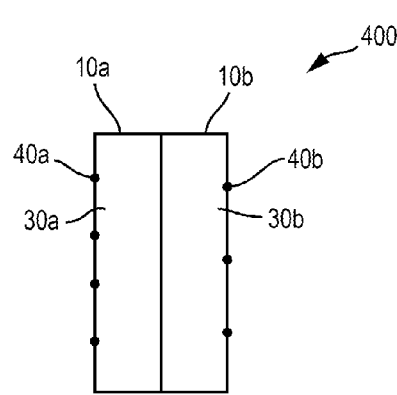
FIG. 4 is a side view of a stacked structure according to an exemplary embodiment.

FIG. 4 illustrates a stacked structure 400 of individual layers 10a and 10b of metamaterials according to an embodiment of the invention, where the individual layers 10a and 10b have refractive index plasmon resonances at different predetermined EMR wavelengths. The layers 10a and 10b have respective nano-particles 40a, 40b formed in respective matrix materials 30a, 30b of the layers 10a and 10b.

The plurality of nano-particles 40a and 40b are geometrically arranged in an array such that single individual layers 10a and 10b each have a refractive index plasmon resonance based on a cooperative plasmon effect at a predetermined EMR wavelength. In particular, the nano-particles 40a and 40b are arranged in the matrix materials 30a and 30b such that the predetermined EMR wavelengths for the refractive index plasmon resonances is different for the different individual layers 10a and 10b.

The nano-particles 40a and 40b may be arranged in the matrix materials 30a and 30b to provide different predetermined EMR wavelengths in different manners. For example, any of the lattice spacing, particle size or shape, particle material or matrix material may be adjusted to optimize a particular layer 10a or 10b to provide that the layer has a refractive index plasmon resonance at a desired predetermined EMR wavelength.

Figure 5:
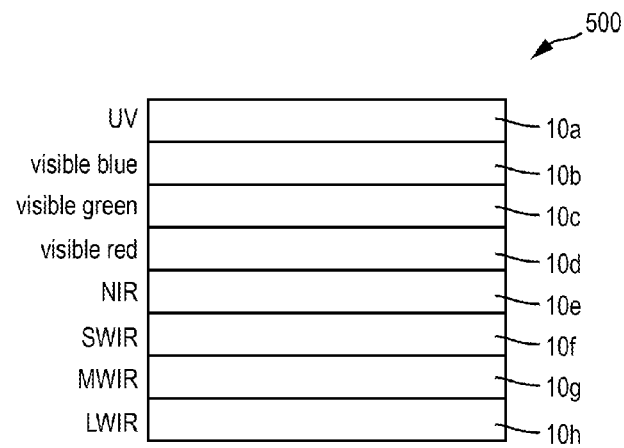
FIG. 5 is a stacked structure including several individual layers according to an exemplary embodiment.

FIG. 5 illustrates a stacked structure 500 of individual layers 10 (10a, 10b, 10c, 10d, 10e, 10f, 10g and 10h), according to another embodiment of the invention, where the individual layers 10 have refractive index plasmon resonances at different predetermined EMR wavelengths. The embodiment illustrated in FIG. 5 is different from that illustrated in FIG. 4 in that the FIG. 4 embodiment illustrated only two individual layers, while the FIG. 5 embodiment discloses eight individual layers 10a, 10b, 10c, 10d, 10e, 10f, 10g and 10h. The individual layers 10a, 10b, 10c, 10d, 10e, 10f, 10g and 10h, respectively have refractive index plasmon resonances at predetermined EMR wavelengths in the ultraviolet (UV), visible Blue, Visible Green, Visible Red, IR, near IR (NIR), short wavelength IR (SWIR), mid wavelength IR (MWIR), and long wavelength IR (LWIR). While FIG. 5 illustrates an individual layer 10h with a refractive index plasmon resonance in the LWIR, a layer with a resonance in the THz regime of the EMR spectrum is also possible.

In general, while the embodiments of FIGS. 4 and 5 illustrate stacked structures with two and eight individual layers 10, respectively, where each individual layer has a refractive index plasmon resonance at a different predetermined EMR wavelengths, in general, the number of individual layers may be two or more. For example, the number of layers may be three, where the predetermined EMR wavelengths for refractive index plasmon resonance are in the UV, visible and NIR, respectively.

At the nano-scale, the optical fields are just electric oscillations at optical frequencies. Optical fields penetrate the entire nm-sized metal particles, which are much smaller than the skin-depth.

Thus, in general, for the stacked structure of individual layers where each individual layer has a refractive index plasmon resonances at a different predetermined EMR wavelength, the total thickness of the composite stack containing the individual layers should be less than the predetermined EMR wavelength of the shortest wavelength. A broadband response to EMR may be achieved, because the composite thickness of all the layers of the stack is less than the shortest wavelength. Further in the case that metal nano-particles or a metal matrix material is employed, the skin depth of the metals used should be much greater than the size of the metal nano particles and/or layer thickness.

Moreover, in the stacked structure, the spacing between the individual layers is arranged such that a particular layer's nano-particles are resonating in-plane cooperatively, but not resonating in any way at all tangentially to that plane, i.e., the individual layers must operate entirely independently. To achieve this, some in-commensurate (non-resonant) spacing is chosen between the planes, typically of order tens of nanometers. For example, the spacing between individual layers in order to avoid non-resonant absorption should not be an integer multiple of any of the predetermined EMR resonant wavelengths for the stack. Ten such individual layers, such as shown in FIG. 5, for example, might involve a stack of individual layers only 100 nm thick in total, still much less than even the blue-light wavelength of 460 nm, and very much less than any infra-red radiation wavelengths.

Broadband Index of Refraction in Single Materials System

Figure 6:
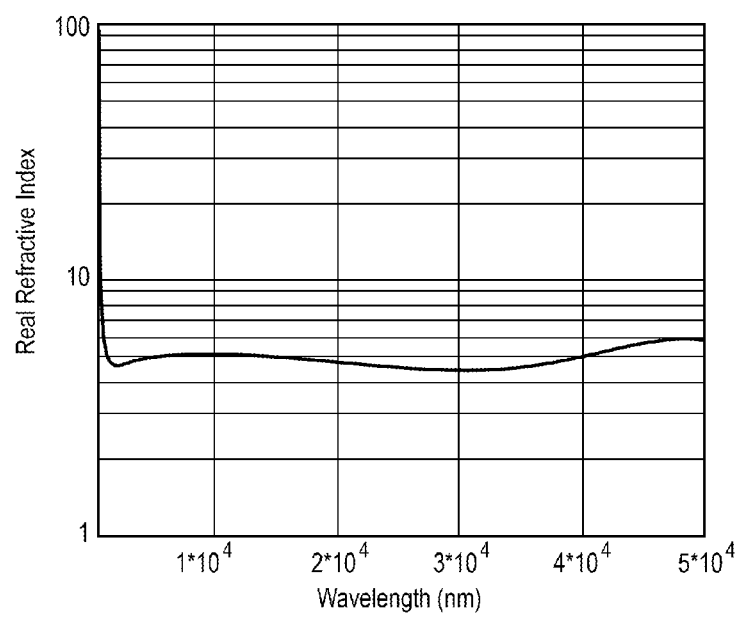
FIG. 6 is a graph showing the refractive index as a function of EMR wavelength for cylindrical gold nano-particles of length 20 nm in a silicon matrix.
Figure 7:
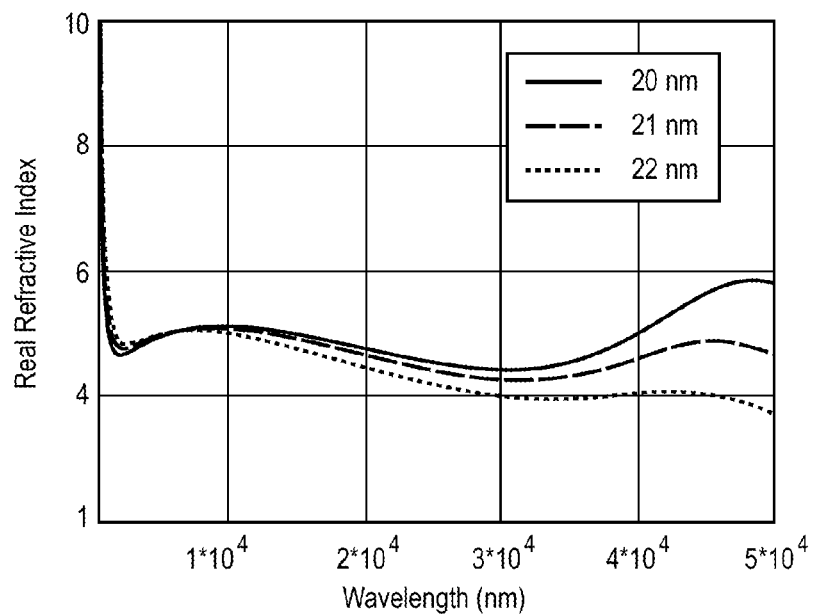
FIG. 7 is a graph showing the refractive index as a function of EMR wavelength for cylindrical gold nano-particles of lengths 20 nm, 21 nm, and 22 nm in a silicon matrix.

FIGS. 6 and 7 illustrate examples of a single materials system, namely gold nano-particles in silicon, that can provide a refractive index plasmon resonance at predetermined EMR wavelengths over a broad spectrum. The materials system for FIGS. 6 and 7 comprise cylindrically shaped gold nano-particles 10 nm in diameter in a silicon matrix, where the lattice spacing was 50 nm. FIG. 6 illustrates the refractive index for a gold cylinder length of 20 nm, while FIG. 7 illustrates the refractive index for gold cylinder lengths of 20 nm, 21 nm and 22 nm.

FIGS. 6 and 7 illustrate a result of a calculation of refractive index as a function of EMR wavelength, where the refractive index was maximized at each wavelength by varying the lattice spacing and cylinder length of the gold nano-particle in the silicon. The EMR wavelength range was from 200 nm in the UV out to 50 microns in the very far IR (50,000 nm). As can be seen it is possible to design performance with the real refractive index exceeding 5.5 across the entire IR spectrum and rising above 10 in the visible and ultraviolet regions, as seen in FIGS. 6 and 7.

Spatial Variation of Refractive Index in Individual Layers

In general, the local refractive index of an individual layer may be spatially varied by spatially varying the arrangement of nano-particles in the layer to provide a graded index. The local refractive index of the individual layer may be spatially varied, using a variable arrangement of the nano-particle in the substrate plane, for example, by (1) varying the refractive index for a given wavelength by detuning the plasmon resonance, or (2) varying the wavelength response for a given refractive index's plasmon resonance.

Figure 8:
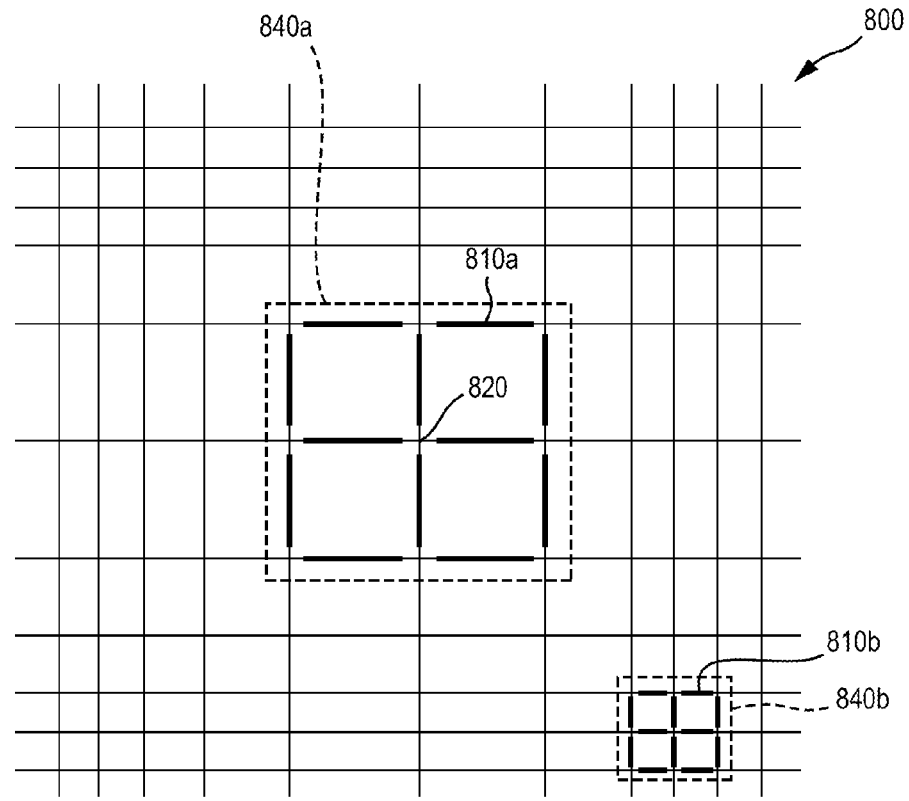
FIG. 8 illustrates a front view of a layout of nano-particles of a GRIN lens according to an exemplary embodiment.

FIG. 8 illustrates a top view of a layout of nano-particles 810 (810a or 810b) for an individual layer 800 in the plane of the layer 800. The nano-particles 810 in the layer 800 are arranged in a square lattice, and thus provide a polarization insensitive arrangement.

In FIG. 8, the nano-particles 810 are arranged on lattice lines 830. For ease of illustration, only some of the nano-particles are shown in FIG. 8 on the lattice lines, and in particular, only two 2×2 square regions 840a and 840b, are shown. In general, the nano-particles will be arranged on the lattice lines 830 of the entire lattice.

The refractive-index in the two different 2×2 square regions 840a and 840b is substantially different, because the nano-particle lattice constant of the square region 840a located at the center 820 of the layer 800 is different than that of the square region 840b located further away from the center 820. While FIG. 8 illustrates the nano-particle lattice constant decreasing with an increasing distance from the center 820, alternatively, the nano-particle lattice constant may increase with an increasing distance from the center axis 820. The underlying spatially varying grid pattern of the lattice lines 830 illustrates how spatial-grading of the nano-particle lattice constant proceeds across a plane to make a graded-refractive index plane.

While FIG. 8 illustrates a polarization insensitive arrangement where all four sides of each square lattice cell in FIG. 8 have a nano-particle, polarization sensitive arrangements are also possible. A polarization sensitive arrangement may be accomplished, for example, by having only two opposing sides of each square cell be occupied with a nano-particle, where only the vertical or horizontal of the lattice lines 830 are occupied.

While FIG. 8 illustrates a design where the nano-particle lattice constant is varied, alternatively, the nano-particle lattice constant may be fixed, and only the nano particle thickness and length may be varied to create a desired refractive index and dispersion profile. In general, any one or more of the nano-particle lattice constant, length and thickness may be varied.

Figure 9:
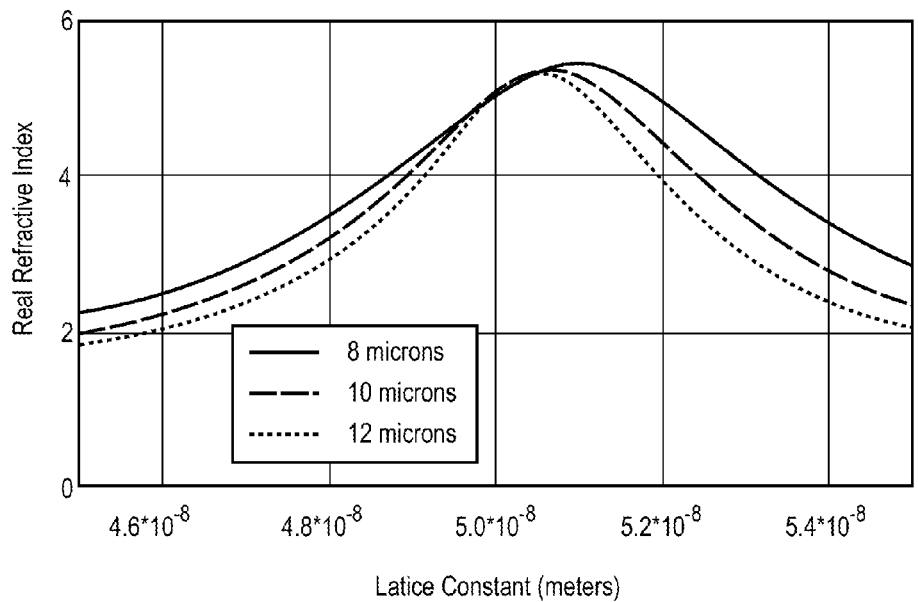
FIG. 9 is a graph showing the refractive index as a function of lattice spacing for gold nano-particles in a silicon matrix at EMR wavelengths of 8, 10 and 12 microns.

FIG. 9 is a graph illustrating a calculation of the refractive index as a function of lattice spacing at EMR wavelengths of 8, 10 and 12 microns for gold nano-particles in a silicon matrix. The size and shape of the gold nano-particles was fixed with cylindrically shaped gold nano-particles of 20 nm length and 10 nm diameter with a lattice spacing varying from 45 nm to 55 nm. The refractive index plasmonic resonance occurs at about 51 nm lattice spacing.

Figure 10:
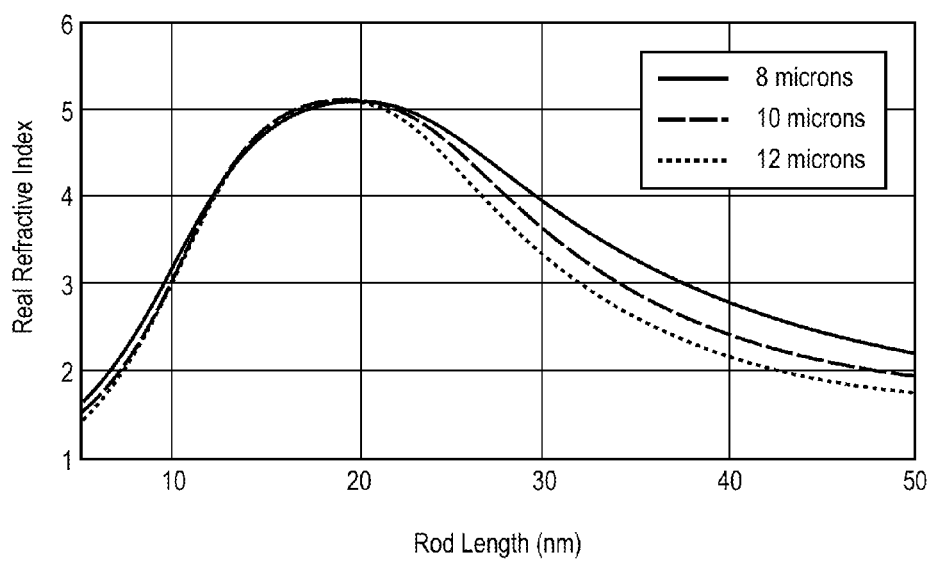
FIG. 10 is a graph showing the refractive index as a function of nano-particle length for gold nano-particles in a silicon matrix at EMR wavelengths of 8, 10 and 12 microns.

FIG. 10 is a graph illustrating a calculation of the refractive index as a function of nano-particle length at EMR wavelengths of 8, 10 and 12 microns for gold nano-particles in a silicon matrix. The lattice spacing of the cylindrical gold nano-particles was fixed at 50 nm, and the cylinder diameter was fixed at 10 nm. The cylinder length was varied from 5 nm to 50 m. The refractive index plasmonic resonance occurs at about or just below 20 nm cylinder length.

Figure 11:
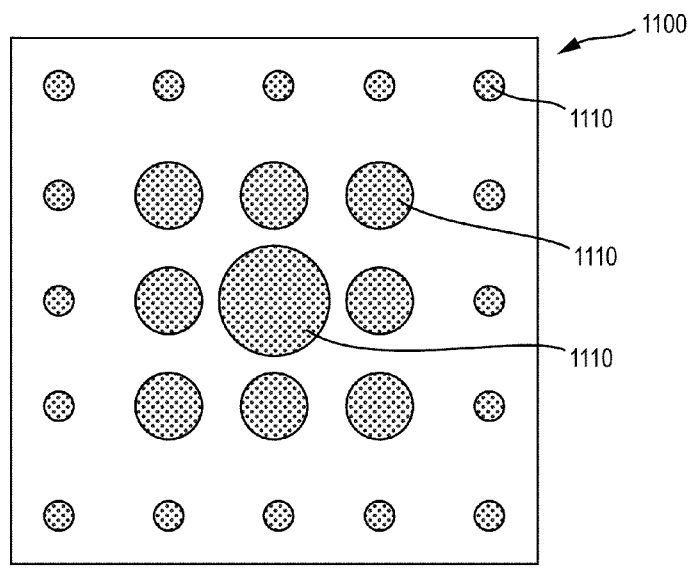
FIG. 11 illustrates a front view of a layout of nano-particles where the width of the nano-particles is varied according to an exemplary embodiment.

FIG. 11 illustrates an arrangement where the index of refraction is spatially varied across the plane of an individual layer 1100, where the nano-particles 1110 have a long axis oriented perpendicular to the plane of the layer. FIG. 11 is a top view looking down on the plane of the individual layer 1100 with the long axis of the nano-particles pointing into the page. The nano-particles 1110 are arranged with a fixed lattice spacing.

In FIG. 11, the index of refraction is spatially varied across the plane of an individual layer 1100 by varying the width of the nano-particles 1110 across the plane of the individual layer 1100. While FIG. 11 illustrates the widest nano-particles 1110 in the center of the plane of the individual layer 1100, alternatively, the narrowest nano-particles 1110 may be in the center. Further, while FIG. 11 illustrates the index of refraction is spatially varied across the plane of an individual layer 1100 by varying the width of the nano-particles 1110 across the plane, alternatively the length of the nano-particles 1110 may be varied. An irregular lattice spacing could also be used to augment or locally adjust the refractive index profile.

Lens of Stacked Individual Layers of Metamaterials

Figure 12:
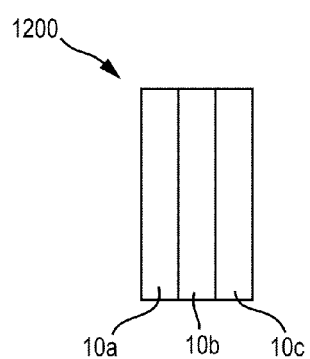
FIG. 12 illustrates a side view of a GRIN lens having a stacked structure according to an exemplary embodiment.
Figure 13:
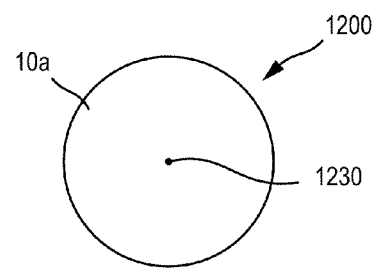
FIG. 13 illustrates a front view of the GRIN lens of FIG. 12, where the index of refraction is spatially varying.

FIGS. 12 and 13 illustrate a lens 1200, where the lens 1200 is a graded-index (GRIN) lens, formed of stacked individual layers 10 (layers 10a, 10b, 10c), where the index of refraction for each of the individual layers 10 is spatially varied across the plane of the individual layer. Each of the individual layers 10 is formed of a metamaterial with nano-particles embedded in a matrix material. Each individual layer 10 has a refractive index plasmon resonance based on a cooperative plasmon effect at a predetermined EMR wavelength. The different individual layers 10 have their respective refractive index plasmon resonances at different predetermined EMR wavelengths. Examples of appropriate materials for the individual layers are discussed above.

FIG. 12 illustrates a side view of the lens 1200. While FIG. 12 shows only three individual layers 10 (layers 10a, 10b, 10c), in general, the number of individual layers is two or more.

FIG. 13 illustrates a top view of the lens 1200. The lens 1200 may have a flat surface. The GRIN lens 1200 has an index of refraction which varies as a function of the radial distance from the central axis 1230 of the lens 1200. The local refractive index of the lens 1200 may be spatially varied, for example, as discussed above, by varying the lattice constant of each individual layer 10 as a function of the distance from the central axis 1230. The spatial scale of the geometrical arrangement of the nano-particle dimensions may be non-uniform such that each individual layer 10 has a spatially varying refractive index gradient for the lens 1200.

In general, the local refractive index of the GRIN lens may be spatially varied by spatially varying the arrangement of nano-particles in each individual layer 10. The local refractive index of each individual layer 10 may be spatially varied, as discussed above, using a variable arrangement of the nano-particle in the substrate plane, for example, by (1) varying the refractive index for a given wavelength by detuning the plasmon resonance, or (2) varying the wavelength response for a given refractive index's plasmon resonance. To use this spatially graded refractive index, EMR may be directed parallel to the plane of nano-particles, or perpendicular to that plane depending on the functionality required.

The rays of EMR directed co-planar with the nano-particles will be progressively curved to focus or diverge according to the point of entry and direction into the nano-particle arrangement of the GRIN lens, and the grid spacing of the lattice may be arranged to make such ray curvature, as well as refractive index distribution, parabolic, hyperbolic, ellipsoidal or some other geometry. Thus, the described nano-particle based lenses here provide an advantage over the parabolic— like existing GRIN lenses. The lens can have a lens length, and principal points, and an extent that provides a focal point or a reversal of rays, as is usual for a GRIN lens.

EMR directed perpendicular to the plane of nano-particles, especially with variation of nano-particle dimensions in each small square-cell can allow the creation of gradient-spectral focusing—i.e., different effects for different EMR wavelengths, especially for oblique illuminations.

Figure 14:
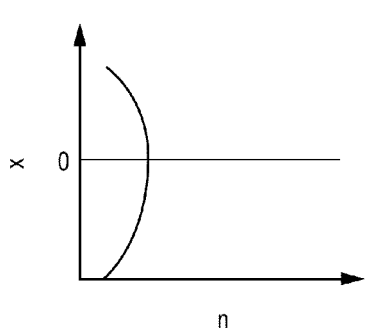
FIG. 14 is a graph illustrating the variation of index of refraction of a GRIN lens with radial distance according to an exemplary embodiment.
Figure 15:
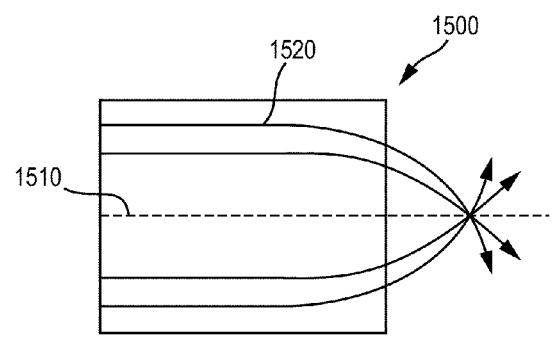
FIG. 15 is a side cross-sectional view of a GRIN lens according to an exemplary embodiment illustrating the path of EMR rays incident on a front surface of the GRIN lens.

FIG. 14 illustrates the variation of index of refraction n of a GRIN lens with radial distance x for a GRIN lens according to an embodiment of the invention, where FIG. 15 illustrates a side cross-sectional view of a GRIN lens 1500 and illustrates the path of EMR rays 1520 incident on a front surface of the GRIN lens having optical axis 1510. While FIG. 15 illustrates the length of the lens being greater than the width for illustration purposes, in general the length of the lens 1500, which comprises individual layers as discussed above with respect to FIG. 12, for example, will be less than the width. As can be seen in FIG. 14, the GRIN lens of FIG. 15 has a parabolic variation of refractive index (n) with radial distance (x). Thus, the GRIN lens of FIG. 15, which is based on a nano-particle design, focuses EMR in a same way as a conventional lens.

A nano-particle based GRIN lens design provides a great flexibility in GRIN lens design. EMR directed perpendicular to the plane of nano-particles, especially with variation of nano-particle dimensions in each small square cell, can allow the creation of gradient spectral focusing i.e., different effects for different EMR wavelengths, especially for oblique illuminations. Moreover, such a nano-particle based design provides for complete control of the local refractive index and its wavelength sensitivity at the nano-scopic scale, grid square by grid square, as the length and thickness (cross-section) can be changed for each and every nano-particle in the arrays forming the planes of the individual layers of the lens.

The nano-particle based materials disclosed herein may be used for a number of applications including lenses, beam-splitters, thin-film optical coatings, glass covers, and interferometry components, such as a Fabry-Perot interferometer.

The nano-particle based GRIN lens design may have a number of applications. These applications may be, for example, micro-lens and nano-lens arrays, lens-arrays for use with focal-plane array detectors, ultra-wide bandwidth hyper-spectral imagery, telecommunication spatial-multiplexing and signal cross/inter-connections, biological and medical imaging at the cellular and sub-cellular spatial-scale, miniaturized 3D-integral-imaging and computational-imaging systems, focal-plane and hyper-spectral imagers for night-vision and helmet-mounted displays, and UAV surveillance imaging deployment.

The nano-particle based GRIN lens design may provide a nonlinear optics effect. Such nonlinear optics effect may be based on, for example, optical susceptibilities such as $\chi^{(2)}$ and $\chi^{(3)}$.

Fabrication

The nano structures here may be formed by a number of techniques. For example, the nano-particles may formed by at least one of 2-dimensional or 3-dimensional fabrication employing electron-beam lithography, focused ion-beam, nano-imprinting, colloidal imprinting, DNA-scaffolding techniques, membrane projection, or colloid hole lithography. The nano structures here may be formed using bio-macromolecule such as proteins and peptides. The nano structures here may be formed using colloidal-suspensions of nano-particles of suitable size and shape—manipulated into a desired pattern.

The exemplary embodiments of the invention have been described in detail with particular reference to preferred embodiments thereof, but it will be understood by those skilled in the art that variations and modifications can be effected within the spirit and scope of the invention.

What is claimed is:

1. A broadband optical material comprising:
   a stacked structure comprising a plurality of layers of metamaterial, each layer of metamaterial comprising:
   a matrix material; and
   a plurality of nano-particles geometrically arranged in an array within the matrix material such that the layer of metamaterial has a refractive index plasmon resonance based on a cooperative plasmon effect at a predetermined electro-magnetic radiation (EMR) wavelength,
   wherein the predetermined EMR wavelength for the refractive index plasmon resonance is different for each of the layers of metamaterial based on a different nano-particle material, matrix material, nano-particle lattice spacing, nano-particle size or nano-particle shape.

2. The broadband optical material of claim 1, wherein for each of the plurality of layers, the nano-particles are arranged in the array such that nano-particles resonate in a plane of a respective layer, but do not resonate tangentially to the plane.

3. The broadband optical material of claim 1, wherein at least one of the layers of metamaterial has at least one of a spatially varying nano-particle length, nano-particle width, or nano-particle lattice constant.

4. The broadband optical material of claim 3, wherein at least one of the layers of metamaterial has a spatially varying nano-particle length.

5. The broadband optical material of claim 3, wherein at least one of the layers of metamaterial has a spatially varying nano-particle width.

6. The broadband optical material of claim 3, wherein at least one of the layers of metamaterial has a spatially varying nano-particle lattice constant.

7. A gradient index (GRIN) lens comprising the broadband material of claim 1, wherein each layer of metamaterial has a spatially varying refractive index.

8. The GRIN lens of claim 7, where each layer of metamaterial has at least one of a spatially varying nano-particle length, nano-particle width, or nano-particle lattice constant.

9. The GRIN lens of claim 7, wherein, for each of the plurality of layers, the nano-particles are arranged in the array such that nano-particles resonate in the plane of a respective layer, but do not resonate tangentially to the plane.

10. An optical system comprising the broadband optical material of claim 1.

11. The optical system of claim 10, wherein the optical system is one of a micro-lens and nano-lens arrays, a lens-array for a focal-plane array detector, an ultra-wide bandwidth hyper-spectral imagery system, a telecommunication spatial-multiplexing and signal cross/inter-connections system, a biological and medical imaging at the cellular and sub-cellular spatial-scale system, or a miniaturized 3D-integral-imaging and computational-imaging system.

12. The broadband optical material of claim 1, wherein the plurality of nano-particles are formed by at least one of electron-beam lithography, focused ion-beam, nano-imprinting, colloidal-suspension patterning, biological assembly methods, DNA-scaffolding techniques, membrane projection, or colloid hole lithography.

13. The broadband optical material of claim 1, wherein at least one of the layers of metamaterial has nano-particles of a different material than that of at least another of the layers of metamaterial.

14. The broadband optical material of claim 1, wherein the nano-particles in at least one of the layers of metamaterial have a long axis.

15. The broadband optical material of claim 14, wherein the long axis is oriented in a direction parallel to a plane of the at least one of the layers.

16. The broadband optical material of claim 14, wherein the long axis is oriented in a direction perpendicular to a plane of the at least one of the layers.

17. The broadband optical material of claim 16, wherein a width of the nano-particles in the at least one of the layers of metamaterial is spatially varying in a plane of the at least one of the layers of metamaterial.

18. The broadband optical material of claim 16, wherein the broadband optical material provides a non-linear optics effect.

19. The broadband optical material of claim 1, wherein plurality of layers of metamaterial include layers where the predetermined EMR wavelength is respectively in a least two EMR regions selected from ultraviolet, visible, near infrared short wave infrared, mid wave infrared, and long wave infrared.

20. The broadband optical material of claim 19, wherein plurality of layers of metamaterial include layers where the predetermined EMR wavelength is respectively in a least the ultraviolet, visible, or near infrared.

21. A method of operating a broadband optical element comprising: a stacked structure comprising a plurality of layers of metamaterial, each layer of metamaterial comprising: a matrix material; and a plurality of nano-particles geometrically arranged in an array within the matrix material such that the layer of metamaterial has a refractive index plasmon resonance based on a cooperative plasmon effect at a predetermined electro-magnetic radiation (EMR) wavelength, wherein the predetermined EMR wavelength for the refractive index plasmon resonance is different for each of the layers of metamaterial based on a different nano-particle material, matrix material, nano-particle lattice spacing, nano-particle size or nano-particle shape, the method comprising:
adjusting the broadband optical material to receive EMR.

22. A method of forming a broadband optical material comprising a stacked structure comprising a plurality of layers of metamaterial, the method comprising:
forming, for each of the layers of metamaterial, a matrix material; and
embedding, tier each of the layers of metamaterial, a plurality of nano-particles geometrically arranged in an array within the matrix material such that the layer of metamaterial has a refractive index plasmon resonance based on a cooperative plasmon effect at a predetermined electro-magnetic radiation (EMR) wavelength,
wherein the predetermined EMR wavelength for the refractive index plasmon resonance is different for each of the layers of metamaterial based on a different nano-particle material, matrix material, nano-particle lattice spacing, nano-particle size or nano-particle shape.

* * * * *